US012786837B2

(12) United States Patent
Yamamoto et al.

(10) Patent No.: US 12,786,837 B2
(45) Date of Patent: Nov. 3, 2026

(54) FIRST BASE STATION, COMMUNICATION APPARATUS, AND METHOD

(71) Applicants: DENSO CORPORATION, Kariya-city (JP); TOYOTA JIDOSHA KABUSHIKI KAISHA, Toyota (JP)

(72) Inventors: Tomoyuki Yamamoto, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 18/586,751

(22) Filed: Feb. 26, 2024

(65) Prior Publication Data

US 2024/0196299 A1 Jun. 13, 2024

Related U.S. Application Data

(63) Continuation of application No. PCT/JP2022/031561, filed on Aug. 22, 2022.

(30) Foreign Application Priority Data

Aug. 27, 2021 (JP) ................................ 2021-138944

(51) Int. Cl.
*H04W 36/00* (2009.01)
*H04W 36/08* (2009.01)
*H04W 36/32* (2009.01)

(52) U.S. Cl.
CPC ..... *H04W 36/324* (2023.05); *H04W 36/0055* (2013.01); *H04W 36/08* (2013.01); *H04W 36/326* (2023.05)

(58) Field of Classification Search
CPC ........... H04W 36/324; H04W 36/0055; H04W 36/08; H04W 36/326; H04W 36/0064; H04W 4/40; H04W 92/20
See application file for complete search history.

(56) References Cited

U.S. PATENT DOCUMENTS 11,961,406 B2 * 4/2024 Hong .................. H04W 36/083
2019/0306754 A1 10/2019 Shan et al.
(Continued)

FOREIGN PATENT DOCUMENTS

EP 3833059 A1 6/2021
WO WO-2023277752 A1 * 1/2023 ........ H04W 36/0058
(Continued)

OTHER PUBLICATIONS

3GPP TS 36.331 V15.14.0 (Jun. 2021), "3rd Generation Partnership Project; Technical Specification Group Radio Access Network; Evolved Universal Terrestrial Radio Access (E-UTRA); Radio Resource Control (RRC); protocol specification (Release 15)", pp. 1-966.
(Continued)

*Primary Examiner* — William G Trost, IV
(74) *Attorney, Agent, or Firm* — Harness, Dickey & Pierce, P.L.C.

(57) ABSTRACT

A first base station includes: a memory storing a program; and one or more processors configured to execute the program to: receive, from a communication apparatus, a first radio resource control, RRC, message including information indicating that the communication apparatus has path information available; transmit, to the communication apparatus, a second RRC message including information for requesting transmission of the path information; determine whether to perform a handover from the first base station to a second base station for the communication apparatus; receive in response to the transmission of the second RRC message including the information for requesting transmission of the path information, from the communication apparatus, a third RRC message including the path information in a case where the communication apparatus has the path information available; and include the path information in a Han-
(Continued)

doverPreparationInformation message in a case where the handover is determined to be performed.

12 Claims, 9 Drawing Sheets

(56) References Cited

U.S. PATENT DOCUMENTS

| | | | | |
|---|---|---|---|---|
| 2021/0021334 | A1* | 1/2021 | Tang | H04B 7/18506 |
| 2021/0195479 | A1* | 6/2021 | Wei | H04W 36/0061 |
| 2021/0256855 | A1 | 8/2021 | Hong | |
| 2022/0386208 | A1* | 12/2022 | Phuyal | G08G 5/57 |
| 2024/0049096 | A1* | 2/2024 | Han | H04W 36/0064 |
| 2024/0196467 | A1 | 6/2024 | Yamamoto | |

FOREIGN PATENT DOCUMENTS

| | | | |
|---|---|---|---|
| WO | WO-2023027022 | A1 | 3/2023 |
| WO | WO-2023027024 | A1 | 3/2023 |
| WO | WO-2023027025 | A1 | 3/2023 |
| WO | WO-2023027026 | A1 | 3/2023 |

OTHER PUBLICATIONS

3GPP TSG-RAN WG2 Meeting #101bis Sanya, China, Apr. 16-20, 2018, R2-1805125, Huawei, HiSilicon, CMCC, Fraunhofer, Nokia, Nokia Shanghai Bell, Lenovo, Motorola Mobility, InterDigital, KDDI, "Discussion on flight path information", pp. 1-4.

3GPP TSG RAN—RAN-Rel-18 workshop, Online, Jun. 28, 2021-Jul. 2, 2021, RWS-210190, Ericsson, "Motivation for Rel-18 UAV", pp. 1-4.

3GPP TSG RAN Rel-18 workshop, Electronic Meeting, Jun. 28-Jul. 2, 2021, RWS-210254, Lenovo, Motorola Mobility, "Discussion on UAV Swarm Support in NR RAN for Rel-18", pp. 1-5.

3GPP TSG Ran Rel-18 workshop, Electronic Meeting, Jun. 28-Jul. 2, 2021, RWS-210474, ZTE, Sanechips, "Support of UAV for 5G Advanced", pp. 1-6.

International Search Report dated Nov. 15, 2022 in corresponding Application No. PCT/JP2022/031561.

3GPP TSG-RAN WG2 Meeting #102 Busan, Korea, May 21-25, 2018, R2-1807894, Lenovo, Motorola Mobility, "Discussion on flight path information reporting", sections 1, 2, pp. 1-3.

U.S. Appl. No. 18/586,695, Yamamoto et al.

U.S. Appl. No. 18/587,017, Yamamoto et al.

U.S. Appl. No. 18/587,310, Yamamoto et al.

U.S. Appl. No. 18/587,389, Yamamoto, Tomoyuki.

3GPP TS 36.331, V16.5.0 (Jun. 2021), "3rd Generation Partnership Project; Technical Specification Group Radio Access Network; Evolved Universal Terrestrial Radio Access (E-UTRA); Radio Resource Control (RRC); Protocol specification (Release 16)", vol. RAN WG2, Jul. 6, 2021, pp. 1-1091.

Nokia, Nokia Shanghai Bell, 3GPP TSG-RAN WG2 Meeting No. 102, R2-1807886, "Text Proposal to 36.331: Flight Path Information," LTE Aerial-Core, Release 15, Agenda item: 9.18.3, vol. RAN WG2, No. Busan, South Korea; May 11, 2018, pp. 1-12.

* cited by examiner

FIRST BASE STATION, COMMUNICATION APPARATUS, AND METHOD

CROSS-REFERENCE TO RELATED APPLICATIONS

This application is a continuation application of PCT/JP2022/031561, filed on Aug. 22, 2022, which application is based on and claims priority to Japanese Patent Application No. 2021-138944, filed on Aug. 27, 2021, the contents of which are incorporated herein by reference.

BACKGROUND

1. Technical Field

The present disclosure relates to a first base station, a communication apparatus, and a method.

2. Related Art

In 3rd Generation Partnership Project (3GPP) (registered trademark) Release 15, as a work item for long term evolution (LTE), some features for unmanned aerial vehicles (UAVs) as user equipments (UEs) have been discussed and specified.

SUMMARY

A first base station according to an aspect of the present disclosure includes: a memory storing a program; and one or more processors configured to execute the program to: receive, from a communication apparatus, a first radio resource control, RRC, message including information indicating that the communication apparatus has path information available; transmit, to the communication apparatus, a second RRC message including information for requesting transmission of the path information; determine whether to perform a handover from the first base station to a second base station for the communication apparatus; receive in response to the transmission of the second RRC message including the information for requesting transmission of the path information, from the communication apparatus, a third RRC message including the path information in a case where the communication apparatus has the path information available; and include the path information in a HandoverPreparationInformation message in a case where the handover is determined to be performed.

A communication apparatus according to an aspect of the present disclosure includes: a memory storing a program; and one or more processors configured to execute the program to: transmit, to a first base station, a first radio resource control, RRC, message including information indicating that the communication apparatus has path information available; receive, from the first base station, a second RRC message including information for requesting transmission of the path information; perform a handover from the first base station to a second base station; and transmit in response to the reception of the second RRC message including the information for requesting transmission of the path information, to the first base station, a third RRC message including the path information in a case where the communication apparatus has the path information available, wherein the path information is included in a HandoverPreparationInformation message for the handover from the first base station to the second base station.

A method performed by a first base station according to an aspect of the present disclosure, includes: receiving, from a communication apparatus, a first radio resource control, RRC, message including information indicating that the communication apparatus has path information available; transmitting, to the communication apparatus, a second RRC message including information for requesting transmission of the path information; determining whether to perform a handover from the first base station to a second base station for the communication apparatus; receiving in response to the transmission of the second RRC message including the information for requesting transmission of the path information, from the communication apparatus, a third RRC message including the path information in a case where the communication apparatus has the path information available; and including the path information in a HandoverPreparationInformation message in a case where the handover is determined to be performed.

DETAILED DESCRIPTION OF THE PREFERRED EMBODIMENTS

Figure 1:
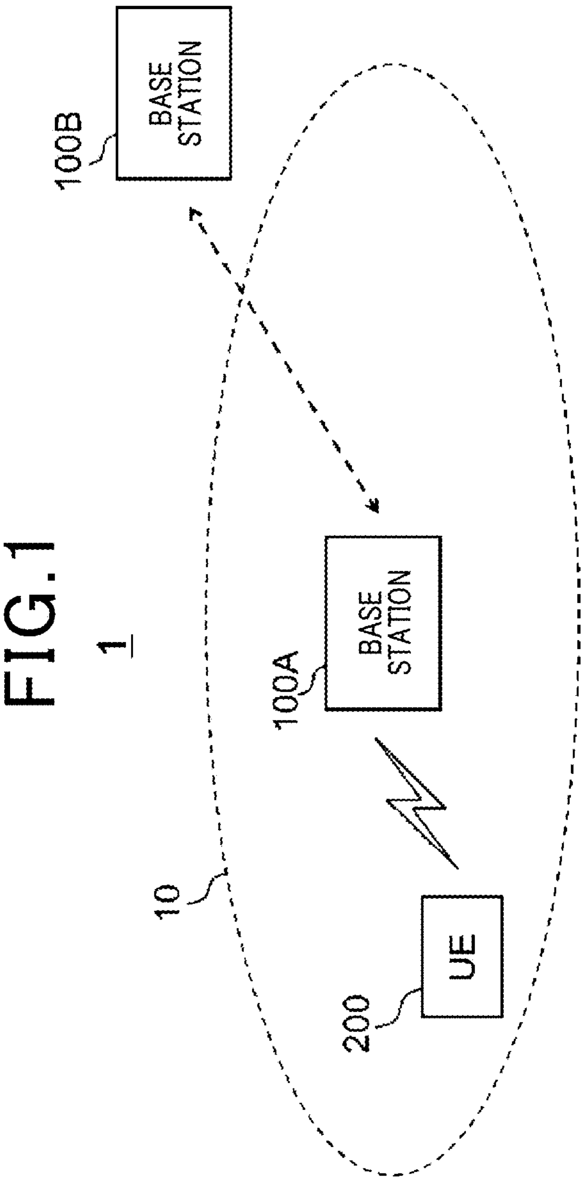
FIG. 1 is an explanatory diagram illustrating an example of a schematic configuration of a system according to embodiments of the present disclosure.

One of the specified features is a Flight Path feature. With the Flight Path feature, a flight path of a UAV is reported from the UAV to a network in response to a request from the network. It is assumed that this will serve for control such as a handover or beamforming based on a moving plan of the UAV on the network side (3GPP TS 36.331 V15.14.0, R2-1805125).

Although the Flight Path feature has not yet been defined for new radio (NR), the utilization of the Flight Path feature has been mentioned in proposals of work items for Release 18 (RWS-210190, RWS-210254, RWS-210474).

A detailed study by the inventors has revealed the following issue. That is, a report of path information may bring about a decrease in the efficiency of signaling in the mechanism in Release 15 described in each of NPLs 1 and 2. For example, a UE reports path information to a base station in the mechanism whenever the UE is handed over between cells. This may cause some kinds of signaling to occur for reporting the same path information. As a result, the efficiency of signaling may decrease.

An object of the present disclosure is to provide a first apparatus, a second apparatus, and a method that each make it possible to prevent a report of path information from decreasing the efficiency of signaling.

A first apparatus (100A) according to an aspect of the present disclosure includes: an information obtaining unit (141) configured to obtain path information indicating at least a moving path of a user equipment for which a handover is performed from the first apparatus to a second apparatus (100B); and a communication processing unit (145) configured to transmit an apparatus-to-apparatus message including the path information to the second apparatus. The apparatus-to-apparatus message is a message associated with a handover.

A second apparatus (100B) according to an aspect of the present disclosure includes: a communication processing unit (145) configured to receive, from a first apparatus (100A), an apparatus-to-apparatus message including path information that indicates at least a moving path of a user equipment for which a handover is performed from the first apparatus to the second apparatus; and an information obtaining unit (141) configured to obtain the path information included in the apparatus-to-apparatus message. The apparatus-to-apparatus message is a message associated with a handover.

A method performed by a first apparatus (100A) according to an aspect of the present disclosure includes: obtaining path information indicating at least a moving path of a user equipment for which a handover is performed from the first apparatus to a second apparatus (100B); and transmitting an apparatus-to-apparatus message including the path information to the second apparatus. The apparatus-to-apparatus message is a message associated with a handover.

A method performed by a second apparatus (100B) according to an aspect of the present disclosure includes: receiving, from a first apparatus (100A), an apparatus-to-apparatus message including path information that indicates at least a moving path of a user equipment for which a handover is performed from the first apparatus to the second apparatus; and obtaining the path information included in the apparatus-to-apparatus message. The apparatus-to-apparatus message is a message associated with a handover.

According to the present disclosure, it is possible to prevent a report of path information from decreasing the efficiency of signaling. Note that, instead of or in addition to this advantageous effect, the present disclosure may yield another advantageous effect.

Hereinafter, embodiments of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:

1. Configuration of System
2. Configuration of Base Station
3. Configuration of User Equipment
4. Operation Examples
5. Modification Examples

1. CONFIGURATION OF SYSTEM

An example of a configuration of a system 1 according to embodiments of the present disclosure will be described with reference to FIG. 1. Referring to FIG. 1, the system 1 includes a base station 100A, a base station 100B, and a user equipment (UE) 200.

For example, the system 1 is a system compliant with technical specifications (TSs) in 3GPP. More specifically, for example, the system 1 is a system compliant with the TSs of 5G or new radio (NR). Naturally, the system 1 is not limited to this example. For example, the system 1 may be a system compliant with the TSs of LTE, LTE advanced (LTE-A), or 4G.

(1) Base Station 100

Each of the base stations 100 (for example, the base station 100A and the base station 100B) is a node in a radio access network (RAN) and communicates with a UE (for example, UE 200) located within a coverage area 10 of the base station 100.

For example, the base station 100 communicates with a UE (for example, UE 200) by using a RAN protocol stack. For example, the protocol stack includes protocols of radio resource control (RRC), service data adaptation protocol (SDAP), packet data convergence protocol (PDCP), radio link control (RLC), medium access control (MAC), and physical (PHY) layers. Alternatively, the protocol stack does not have to include all of these protocols, but may include some of these protocols.

For example, the base station 100 is a gNB. The gNB is a node that provides NR user plane and control plane protocol terminations towards a UE and is connected to a 5G core network (5GC) via an NG interface. Alternatively, the base station 100 may be an en-gNB. The en-gNB is a node that provides NR user plane and control plane protocol terminations toward a UE and operates as a secondary node in E-UTRA-NR dual connectivity (EN-DC).

The base station 100 may include a plurality of nodes. The plurality of nodes may include a first node that hosts higher layers included in the protocol stack and a second node that hosts lower layers included in the protocol stack. The higher layers may include the RRC layer, the SDAP layer, and the PDCP layer, while the lower layers may include the RLC layer, the MAC layer, and the PHY layer. The first node may be a central unit (CU) and the second node may be a distributed unit (DU). Note that the plurality of nodes may include a third node that performs lower level processing of the PHY layer and the second node may perform higher level processing of the PHY layer. The third node may be a radio unit (RU).

Alternatively, the base station 100 may be one of the plurality of nodes and may be connected to another unit of the plurality of nodes.

The base station 100 may be an integrated access and backhaul (IAB) donor or an IAB node.

In addition, the base station 100 communicates with another base station via an Xn interface. An Xn control plane (Xn-C) is used for signaling with a neighbor base station. For example, the signaling of Xn-C is based on an Xn application protocol (XnAP). An Xn user plane (Xn-U) is used for the transmission of application data to a neighbor base station.

(2) UE 200

The UE 200 communicates with a base station. For example, the UE 200 communicates with the base station 100 in a case where the UE 200 is located within the coverage area 10 of the base station 100.

For example, the UE 200 communicates with a base station (for example, base station 100) by using the protocol stack.

In particular, the UE 200 is mounted on a mobile body. For example, the mobile body may be an aircraft such as a UAV or a vehicle such as an autonomous driving car or a manual driving car with a navigation function. In the mobile body, a moving path may be set in advance. It is possible for the UE 200 to receive benefits of communication control based on the moving path by reporting the moving path to the network (that is, base station 100). A report of the moving path may be supported by, for example, a Flight Path mechanism or another moving path reporting mechanism.

Figure 2:
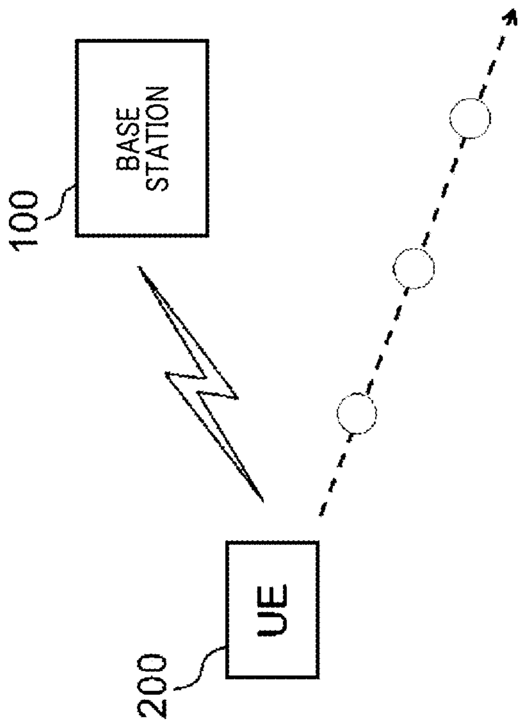
FIG. 2 is an explanatory diagram for explaining an example of communication control based on a moving path of a user equipment according to embodiments of the present disclosure.

Referring to the example of FIG. 2, for example, the UE 200 reports the set moving path to the base station 100. The base station 100 preliminarily performs, for example, processing for a handover or beamforming based on a future position of the UE 200 that is estimated from the reported moving path. This allows communication control suitable for the estimated position to be performed at a timing at which the UE 200 reaches the position.

2. CONFIGURATION OF BASE STATION

Figure 3:
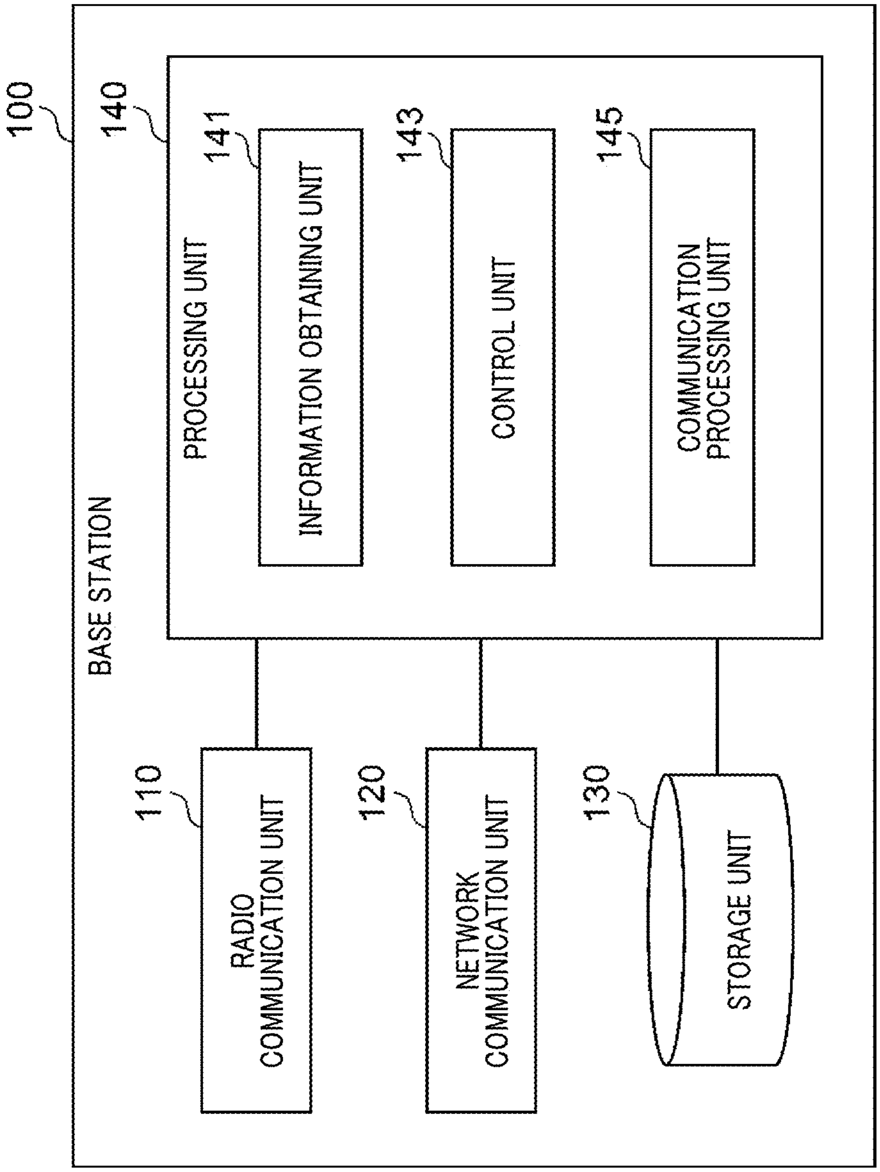
FIG. 3 is a block diagram illustrating an example of a schematic functional configuration of a base station according to embodiments of the present disclosure.
Figure 4:
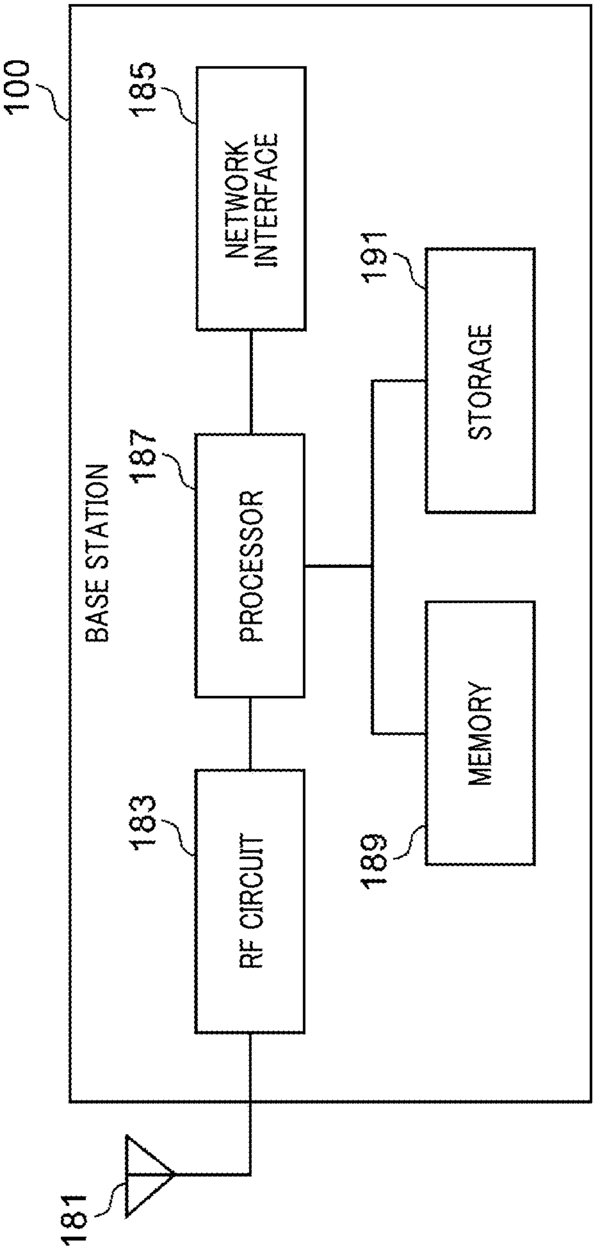
FIG. 4 is a block diagram illustrating an example of a schematic hardware configuration of the base station according to embodiments of the present disclosure.

An example of a configuration of each of the base stations 100 (the base station 100A and the base station 100B) according to embodiments of the present disclosure will be described with reference to FIGS. 3 and 4.

(1) Functional Configuration

First, an example of a functional configuration of the base station 100 according to embodiments of the present disclosure will be described with reference to FIG. 3. Referring to FIG. 3, the base station 100 includes a radio communication unit 110, a network communication unit 120, a storage unit 130, and a processing unit 140.

The radio communication unit 110 wirelessly transmits and receives signals. For example, the radio communication unit 110 receives a signal from a UE and transmits a signal to the UE.

The network communication unit 120 receives a signal from a network and transmits a signal to the network.

The storage unit 130 stores various kinds of information for the base station 100.

The processing unit 140 provides various functions of the base station 100. The processing unit 140 includes an information obtaining unit 141, a control unit 143, and a communication processing unit 145. Note that the processing unit 140 may further include another component in addition to these components. That is, the processing unit 140 may also perform an operation other than operations of these components. Specific operations of the information obtaining unit 141, the control unit 143, and the communication processing unit 145 will be described in detail below.

For example, the processing unit 140 (communication processing unit 145) communicates with a UE (for example, UE 200) via the radio communication unit 110. For example, the processing unit 140 (communication processing unit 145) communicates with another node (for example, a network node in the core network or another base station) via the network communication unit 120.

(2) Hardware Configuration

Next, an example of a hardware configuration of the base station 100 according to embodiments of the present disclosure will be described with reference to FIG. 4. Referring to FIG. 4, the base station 100 includes an antenna 181, a radio frequency (RF) circuit 183, a network interface 185, a processor 187, a memory 189, and a storage 191.

The antenna 181 converts signals into radio waves and emits the radio waves into the air. In addition, the antenna 181 receives radio waves in the air and converts the radio waves into signals. The antenna 181 may include a transmitting antenna and a receiving antenna or may be a single antenna for transmission and reception. The antenna 181 may be a directional antenna and may include a plurality of antenna elements.

The RF circuit 183 performs analog processing on signals that are transmitted and received via the antenna 181. The RF circuit 183 may include a high-frequency filter, an amplifier, a modulator, a lowpass filter, and the like.

The network interface 185 is, for example, a network adaptor, and transmits a signal to a network and receives a signal from the network.

The processor 187 performs digital processing on signals that are transmitted and received via the antenna 181 and the RF circuit 183. The digital processing includes processing of the RAN protocol stack. The processor 187 also performs processing on signals that are transmitted and received via the network interface 185. The processor 187 may include a plurality of processors or may be a single processor. The plurality of processors may include a baseband processor that performs the digital processing and one or more processors that perform other processing.

The memory 189 stores a program to be executed by the processor 187, a parameter associated with the program, and other various kinds of information. The memory 189 may include at least one of a read only memory (ROM), an erasable programmable read only memory (EPROM), an electrically erasable programmable read only memory (EEPROM), a random access memory (RAM), and a flash memory. All or part of the memory 189 may be included in the processor 187.

The storage 191 stores various kinds of information. The storage 191 may include at least one of a solid state drive (SSD) and a hard disc drive (HDD).

The radio communication unit 110 may be implemented by the antenna 181 and the RF circuit 183. The network communication unit 120 may be implemented by the network interface 185. The storage unit 130 may be implemented by the storage 191. The processing unit 140 may be implemented by the processor 187 and the memory 189.

Part or all of the processing unit 140 may be virtualized. In other words, part or all of the processing unit 140 may be implemented as a virtual machine. In this case, part or all of the processing unit 140 may operate as a virtual machine on a physical machine (that is, hardware) including a processor, a memory, and the like and a hypervisor.

Given the hardware configuration described above, the base station 100 may include a memory (that is, memory 189) that stores a program and one or more processors (that is, processor 187) capable of executing the program and the one or more processors may perform operations of the processing unit 140 by executing the program. The program may be a program for causing the processors to execute the operations of the processing unit 140.

3. CONFIGURATION OF USER EQUIPMENT

Figure 5:
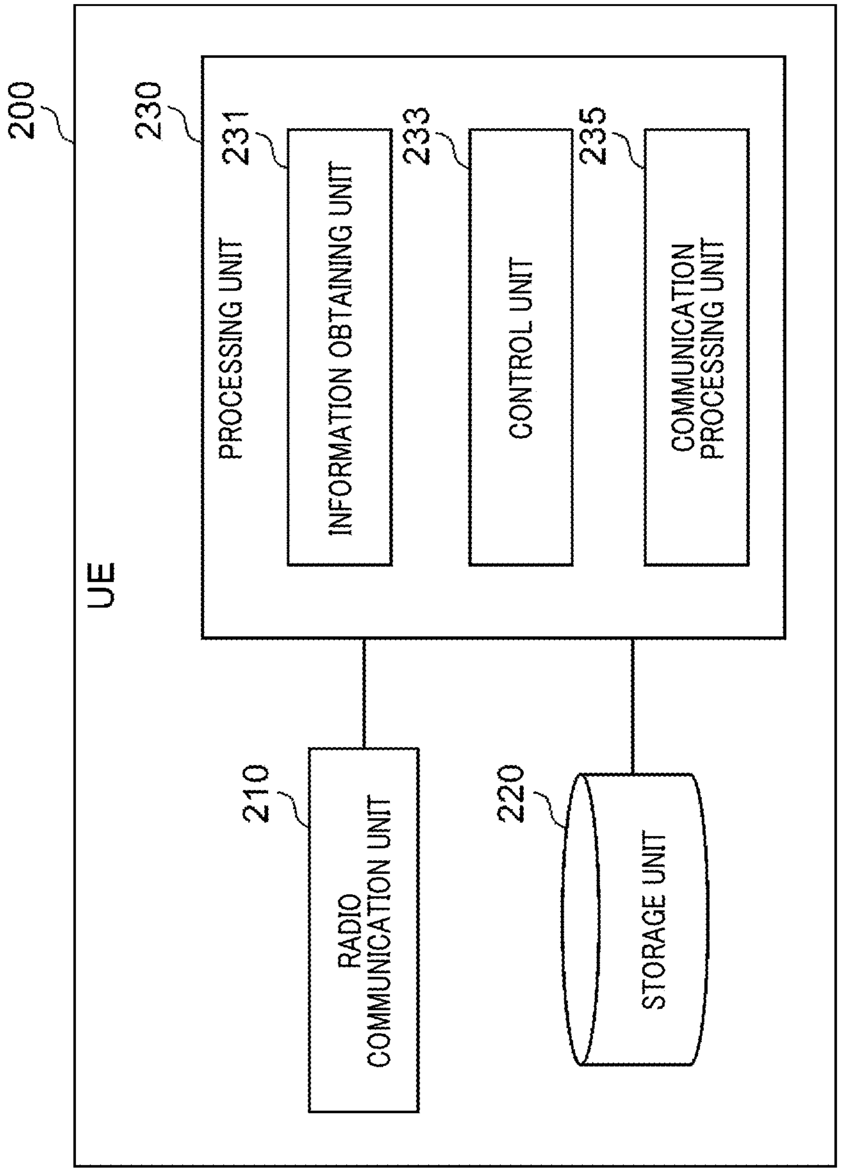
FIG. 5 is a block diagram illustrating an example of a schematic functional configuration of the user equipment according to embodiments of the present disclosure.
Figure 6:
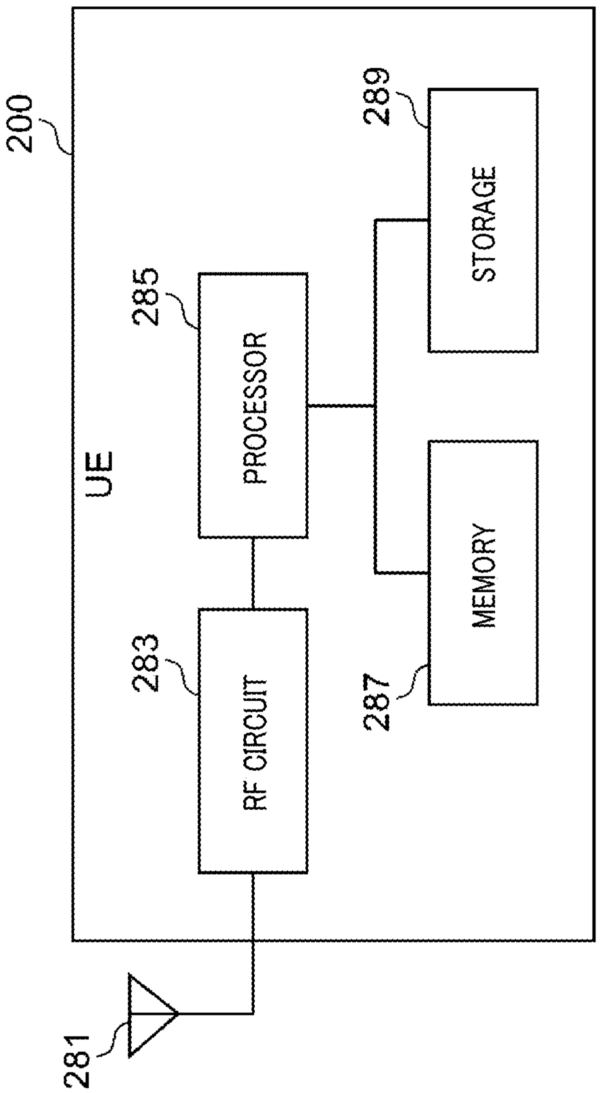
FIG. 6 is a block diagram illustrating an example of a schematic hardware configuration of the user equipment according to embodiments of the present disclosure.

An example of a configuration of the UE 200 according to embodiments of the present disclosure will be described with reference to FIGS. 5 and 6.

(1) Functional Configuration

First, an example of a functional configuration of the UE 200 according to embodiments of the present disclosure will be described with reference to FIG. 5. Referring to FIG. 5, the UE 200 includes a radio communication unit 210, a storage unit 220, and a processing unit 230.

The radio communication unit 210 wirelessly transmits and receives signals. For example, the radio communication unit 210 receives a signal from a base station and transmits a signal to the base station. For example, the radio communication unit 210 receives a signal from another UE and transmits a signal to the other UE.

The storage unit 220 stores various kinds of information for the UE 200.

The processing unit 230 provides various functions of the UE 200. The processing unit 230 includes an information obtaining unit 231, a control unit 233, and a communication processing unit 235. Note that the processing unit 230 may further include another component in addition to these components. That is, the processing unit 230 may also perform an operation other than operations of these components. Specific operations of the information obtaining unit 231, the control unit 233, and the communication processing unit 235 will be described in detail below.

For example, the processing unit 230 (communication processing unit 235) communicates with each of base stations (for example, the base station 100A and the base station 100B) or another UE via the radio communication unit 210.

(2) Hardware Configuration

Next, an example of a hardware configuration of the UE 200 according to embodiments of the present disclosure will be described with reference to FIG. 6. Referring to FIG. 6, the UE 200 includes an antenna 281, an RF circuit 283, a processor 285, a memory 287, and a storage 289.

The antenna 281 converts signals into radio waves and emits the radio waves into the air. In addition, the antenna 281 receives radio waves in the air and converts the radio waves into signals. The antenna 281 may include a transmitting antenna and a receiving antenna or may be a single antenna for transmission and reception. The antenna 281 may be a directional antenna and may include a plurality of antenna elements.

The RF circuit 283 performs analog processing on signals that are transmitted and received via the antenna 281. The RF circuit 283 may include a high-frequency filter, an amplifier, a modulator, a lowpass filter, and the like.

The processor 285 performs digital processing on signals that are transmitted and received via the antenna 281 and the RF circuit 283. The digital processing includes processing of the RAN protocol stack. The processor 285 may include a plurality of processors or may be a single processor. The plurality of processors may include a baseband processor that performs the digital processing and one or more processors that perform other processing.

The memory 287 stores a program to be executed by the processor 285, a parameter associated with the program, and other various kinds of information. The memory 287 may include at least one of a ROM, an EPROM, an EEPROM, a RAM, and a flash memory. All or part of the memory 287 may be included in the processor 285.

The storage 289 stores various kinds of information. The storage 289 may include at least one of an SSD and an HDD.

The radio communication unit 210 may be implemented by the antenna 281 and the RF circuit 283. The storage unit 220 may be implemented by the storage 289. The processing unit 230 may be implemented by the processor 285 and the memory 287.

The processing unit 230 may be implemented by a system on a chip (SoC) including the processor 285 and the memory 287. The SoC may include the RF circuit 283 and the radio communication unit 210 may also be implemented by the SoC.

Given the hardware configuration described above, the UE 200 may include a memory (that is, memory 287) that stores a program and one or more processors (that is, processor 285) capable of executing the program and the one or more processors may perform operations of the processing unit 230 by executing the program. The program may be a program for causing the processors to execute the operations of the processing unit 230.

4. OPERATION EXAMPLES

Examples of operations of the base station 100A, the base station 100B, and the UE 200 according to embodiments of the present disclosure will be described with reference to FIGS. 7 and 8. Here, the base station 100A operates as a first base station and the base station 100B operates as a second base station.

(1) Operation of Base Station 100A

The base station 100A receives path information from the connected UE 200. In a case where the base station 100A performs a handover for the UE 200, the base station 100A transmits the path information about the UE 200 to the base station 100B that is a handover target (also referred to as a target below). The following describes an operation of the base station 100A and relevant information in detail.

(1-1) Obtainment of Path Information

The base station 100A obtains path information indicating at least a moving path of the UE 200. Specifically, the base station 100A (communication processing unit 145) receives an RRC message including the path information from the UE 200. The base station 100A (information obtaining unit 141) obtains the path information included in the received RRC message.

More specifically, when the base station 100A receives, from the UE 200, an RRC message A including information that indicates the availability of the path information, the base station 100A transmits, to the UE 200, an RRC message B including path request information that indicates a request of the path information. The base station 100A then receives an RRC message C including the path information from the UE 200.

For example, the RRC message A is an RRC SetupComp, ReestablishmentComp, ResumeComp, Reconfiguration-Comp, or the like. Further, the RRC message B is a UEInformationRequest and the RRC message C is a UEInformationResponse. In addition, for example, the information indicating the availability of path information is flightPathInfoAvailable or information corresponding to this, the path request information is flightPathInfoReq or information corresponding to this, and the path information is flightPathInfoReport or information corresponding to this.

Note that the path information may be obtained from another base station. For example, the path information may be obtained from another base station via an Xn interface as described below.

(1-2) Handover Processing (Transmission of Path Information)

The base station 100A performs handover processing for the UE 200. Specifically, as handover preparation processing, the base station 100A (control unit 143) determines, based on a Measurement Report from the UE 200, whether or not to perform a handover for the UE 200. In a case where a handover is performed, the base station 100A (communication processing unit 145) transmits a base station-to-base station message associated with the handover to the base station 100B that is a target. The base station-to-base station message includes the path information about the UE 200 that has been already obtained. The base station 100A then receives a response message to the base station-to-base station message from the base station 100B. For example, the handover is a Xn based handover.

The base station-to-base station message is a message for requesting a handover to the base station 100B. For example, the base station-to-base station message may be a Handover Request message as illustrated in information 21 in FIG. 7 that is transmitted via an Xn interface. The Handover Request message is transmitted to the base station 100B using an XnAP. For example, the path information may be included in UE Context Information that is an information element of the Handover Request message. In this way, the path information is included in an existing message for a handover request. This makes it possible to transmit the path information to the base station 100B without additionally defining a new base station-to-base station message.

In addition, the path information is included in the base station-to-base station message as RRC related information. For example, the path information may be included in a HandoverPreparationInformation message of the Handover Request message as illustrated in the information 21 in FIG. 7. Further, the path information may be included in an RRCReconfiguration message of the HandoverPreparation-Information message as illustrated in FIG. 7. In this way, the path information is included in an RRC message of a base station-to-base station message. This makes it possible to explicitly provide the path information to the base station 100B as RRC information (also referred to as RRC context information).

Figure 7:
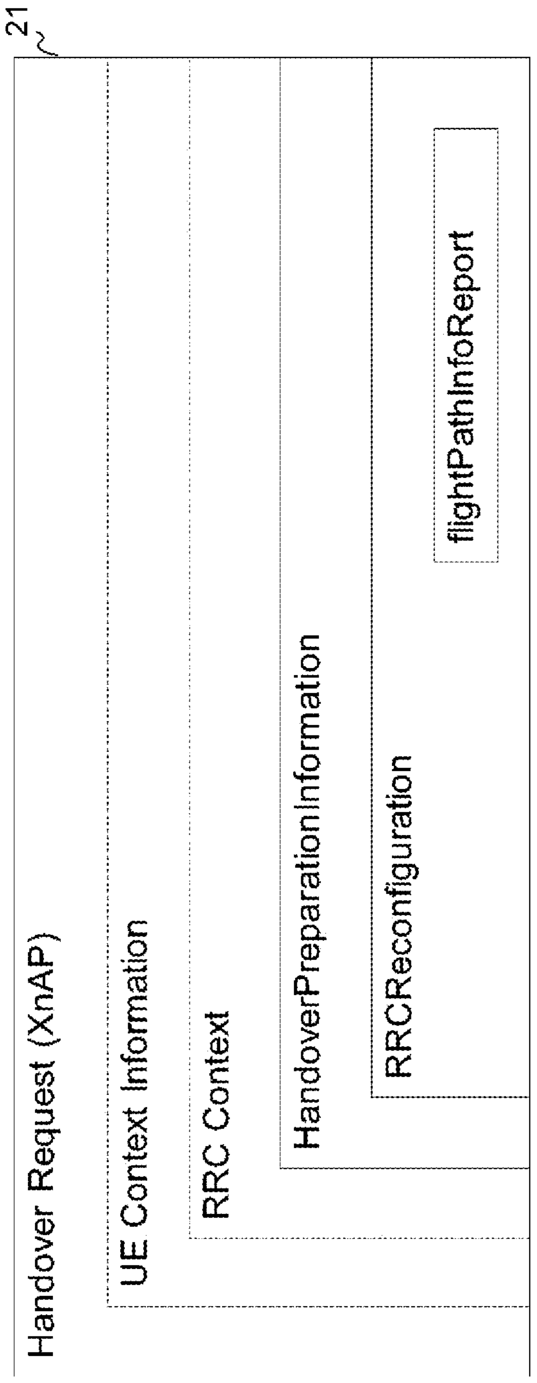
FIG. 7 is an explanatory diagram illustrating an example of a base station-to-base station message including path information according to embodiments of the present disclosure.

Note that the path information may be included in an information element other than UE Context Information as illustrated in the information 21 in FIG. 7 or may be included in an information element other than RRC Context in UE Context Information.

In addition, as handover execution processing, the base station 100A transmits, to the UE 200, an RRC message including information about the base station 100B that is a target. For example, when the base station 100A receives a Handover Request Acknowledgement message as a response message to the base station-to-base station message, the base station 100A transmits an RRCReconfiguration message to the UE 200 based on the Handover Request Acknowledgement message. In addition, the base station 100A transmits a sequence number (SN) Status Transfer message to the base station 100B using an XnAP.

(2) Operation of Base Station 100B

The base station 100B receives path information about the UE 200 from the base station 100A that is a handover source (also referred to as a source below) in handover processing. The following describes an operation of the base station 100B and relevant information in detail. Note that the contents which are substantially the same as the description of an operation of the base station 100A will not be described in detail.

(2-1) Handover Processing (Reception of Path Information)

The base station 100B receives a base station-to-base station message including path information from the base station 100A. Specifically, the base station 100B (communication processing unit 145) receives a base station-to-base station message including the path information about the UE 200 from the base station 100A. The base station 100B (information obtaining unit 141) obtains the path information included in the received base station-to-base station message. The base station-to-base station message is a message associated with a handover.

The base station-to-base station message is a Handover Request message. The base station 100B transmits a Handover Request Acknowledgement message serving as a response to the Handover Request message to the base station 100A using an XnAP. After that, the base station 100B performs a handover for the UE 200.

Note that the path information included in the base station-to-base station message is optional. The path information is not thus always included in the base station-to-base station message.

(3) Operation of UE 200

The UE 200 reports path information to the base station 100A. In addition, in a case where a handover from the base station 100A to the base station 100B is performed for the UE 200, the UE 200 performs a connection procedure to the base station 100B. At this time, the UE 200 does not report the path information to the base station 100B that is a target. The following describes an operation of the UE 200 and relevant information in detail. Note that the contents which are substantially the same as the description of an operation of each of the base stations 100A and 100B will not be described in detail.

(3-1) Report of Path Information

The UE 200 reports path information to the base station 100A. Specifically, the UE 200 (information obtaining unit 231) obtains the set path information. The UE 200 (communication processing unit 235) transmits an RRC message including the obtained path information to the base station 100A.

For example, the UE 200 has report information (for example, flag) indicating whether or not the path information has been reported to any of the base stations 100. In a case where the report information indicates that the path information has not yet been reported, the UE 200 transmits an RRC message including the path information to the connected base station 100A.

More specifically, in a case where the path information has not yet been reported, the UE 200 transmits, to the base station 100A, the RRC message A including the information indicating the availability of the path information. When the UE 200 receives the RRC message B including path request information from the base station 100A, the UE 200 transmits the RRC message C including the path information to the base station 100A. The UE 200 then updates the report information as report information indicating that the path information has been already reported.

In contrast, in a case where the report information indicates that the path information has been already reported, the UE 200 does not transmit the RRC message including the path information to the base station 100A. For example, when a handover changes a connection base station, the UE 200 refers to the report information. In a case where the report information indicates that the path information has been already reported, the UE 200 does not transmit, to the base station 100 that is a target, the RRC message including the information that indicates the availability of the path information. As a result, the path information is not also transmitted to the base station 100 that is a target.

Note that, in a case where the path information is changed, the report information is reset as report information indicating that the path information has not yet been reported. The UE 200 then reports the changed path information to the connected base station 100 when an opportunity of a report comes.

(3-2) Handover Processing

The UE 200 performs handover processing with the base station 100A that is a source and the base station 100B that is a target. Specifically, the UE 200 transmits a Measurement Report to the base station 100A as handover preparation processing. In addition, the UE 200 performs a connection procedure to the base station 100B that is a target as handover execution processing.

For example, the UE 200 performs Random Access Procedure with the base station 100B that is a target based on information about the base station 100B included in an RRCReconfiguration message received from the base station 100A. When the UE 200 completes a connection to the base station 100B, the UE 200 transmits an RRCReconfigurationComplete message to the base station 100B.

Here, in a case where path information is set in the UE, RRCReconfigurationComplete above includes flightPathInfoAvailable in the conventional mechanism as in Release 15. After that, the UE 200 transmits an RRC message including flightPathInfoReport that is path information to the base station 100B in response to a request from the base station 100B.

However, in embodiments of the present disclosure, the path information about the UE 200 has been already reported to the base station 100A and transmitted from the base station 100A to the base station 100B. The UE 200 does not thus have to transmit the path information (and the information indicating the availability of the path information) to the base station 100B. For example, the report information of the UE 200 is updated as report information indicating that the path information has been already reported at the time of a report to the base station 100A and the UE 200 thus determines that the UE 200 refrains from transmission to the base station 100B with reference to the report information.

(4) Flow of Processing

An example of processing according to embodiments of the present disclosure will be described with reference to FIG. 8. FIG. 8 illustrates a case where the UE 200 has already reported path information to the base station 100A.

The UE 200 transmits a Measurement Report to the base station 100A (S410). For example, the UE 200 periodically transmits or is triggered by a specific event to transmit a Measurement Report to the base station 100A.

The base station 100A transmits a Handover Request message including the path information to the base station 100B (S420). For example, the base station 100A determines based on a Measurement Report received from the UE 200 whether or not to perform a handover for the UE 200. In a case where a handover is performed, the base station 100A transmits a Handover Request message including the path information to the base station 100B using an XnAP when the path information (for example, flightPathInfoReport) about the UE 200 has been already received.

The base station 100B transmits a Handover Request Acknowledgement message to the base station 100A (S430). For example, when the base station 100B receives the Handover Request message, the base station 100B stores the path information included in the Handover Request message as RRC context information about the UE 200. The base station 100B then transmits a Handover Request Acknowledgement message including a Handover Command message encapsulating an RRCReconfiguration message to the base station 100A using an XnAP.

The base station 100A transmits an RRCReconfiguration message to the UE 200 (S440). For example, the base station 100A transmits the RRCReconfiguration message to the UE 200 based on the received Handover Request Acknowledgement message.

The base station 100A transmits an SN Status Transfer message to the base station 100B (S450). For example, the base station 100A transmits an SN Status Transfer message including information associated with the status of the sequence number to the base station 100B using an XnAP.

The UE 200 and the base station 100B perform Random Access Procedure (S460). For example, the UE 200 and the base station 100B perform Random Access Procedure based on the respective pieces of information received from the base station 100A in S450 and S460.

The UE 200 transmits an RRCReconfigurationComplete message to the base station 100B (S470). For example, the UE 200 has already reported the path information to the base station 100A and thus transmits, to the base station 100B, an RRCReconfigurationComplete message that does not include the information indicating the availability of the path information. Naturally, the RRCReconfigurationComplete message does not also include the path information.

In this way, according to embodiments of the present disclosure, a base station-to-base station message associated with a handover including path information about the UE 200 for which a handover is performed from the base station 100A to the base station 100B is transmitted from the base station 100A to the base station 100B. This makes it possible to provide the base station 100B that is a target with the path information that has already been reported to the base station 100A which is a source at the time of a handover without the UE 200 reporting the path information to the base station 100B again. That is, it is possible to reduce signaling that is performed for reporting the path information. It is thus possible to prevent a report of the path information from decreasing the efficiency of signaling. As a result, the consumption of radio resources and the consumption of power for communication are reduced.

5. MODIFICATION EXAMPLES

First to fourth modification examples according to embodiments of the present disclosure will be described with reference to FIGS. 8 and 9. Note that two or more of these modification examples may be combined.

(1) First Modification Example: Another Base Station-to-Base Station Message In the embodiments of the present disclosure described above, a base station-to-base station message including path information is a message for requesting a handover. However, the base station-to-base station message including the path information according to embodiments of the present disclosure is not limited to this example.

As the first modification example of embodiments of the present disclosure, the base station-to-base station message including the path information may be a message for sharing the status of a sequence number.

More specifically, the message for sharing the status of the sequence number may be an SN Status Transfer message. For example, the base station 100A includes the path information in an SN Status Transfer message instead of including the path information in a Handover Request message.

Figure 8:
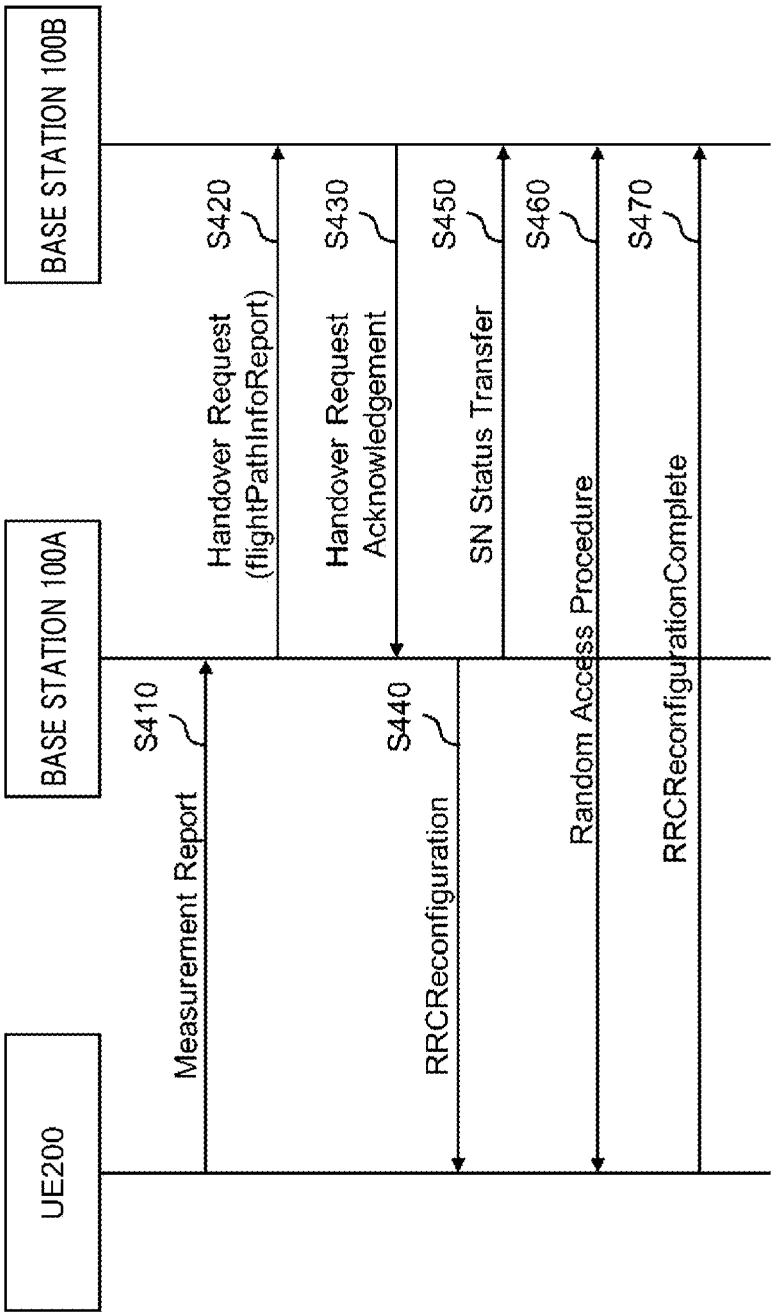
FIG. 8 is a sequence diagram for explaining an example of a schematic flow of processing according to embodiments of the present disclosure.
Figure 9:
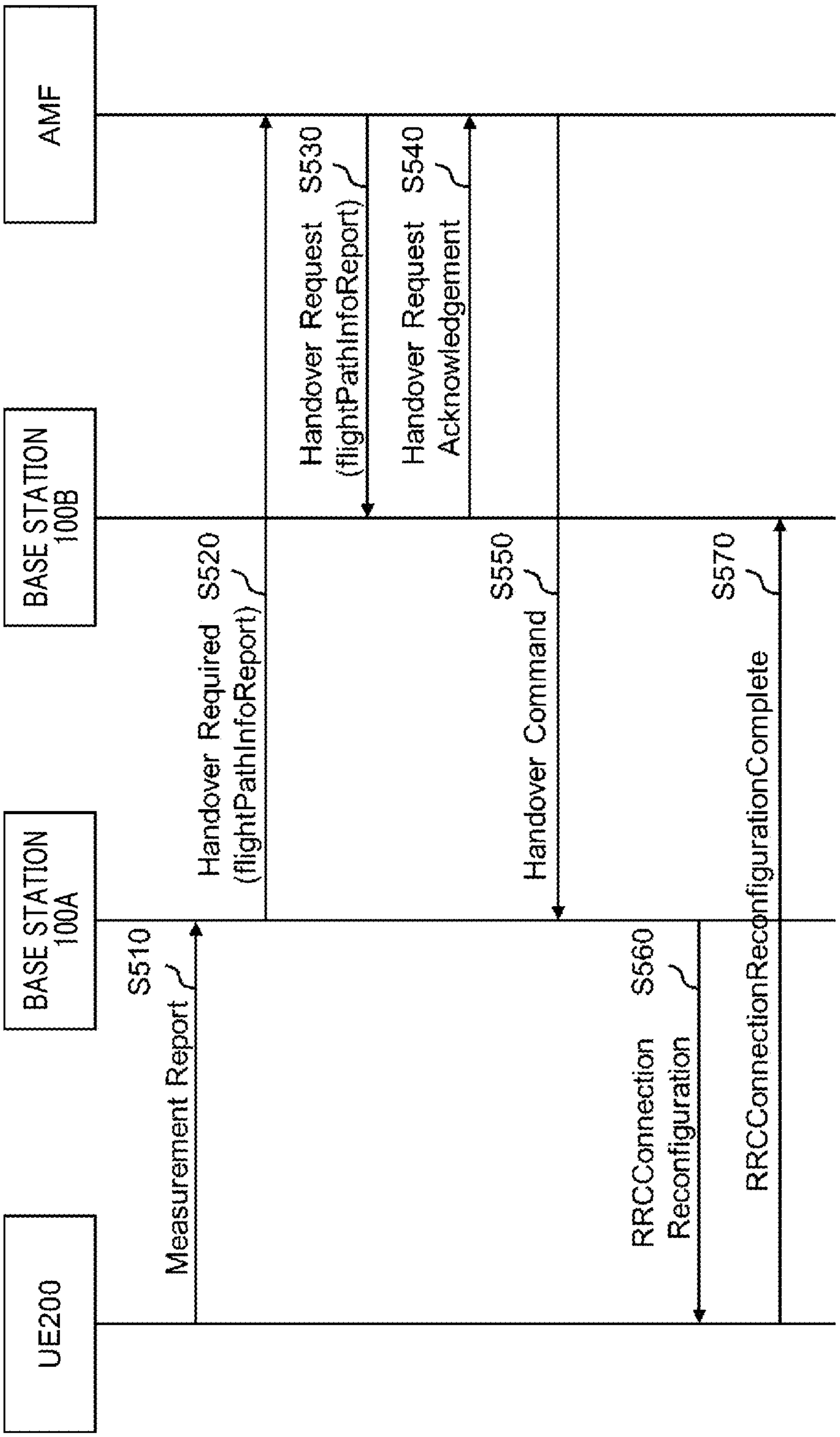
FIG. 9 is a sequence diagram for explaining an example of a schematic flow of processing according to a third modification example of embodiments of the present disclosure.

For example, in FIG. 8, the base station 100A may transmit an SN Status Transfer message including flightPathInfoReport to the base station 100B in S450 instead of transmitting a Handover Request message including flightPathInfoReport in S420.

In this way, according to the first modification example of embodiments of the present disclosure, the base station-to-base station message including the path information is a message for sharing the status of a sequence number. The transmission of the path information to the base station 100B after a handover preparation is completed thus makes it possible to prevent the signaling of the path information from being wasted in a case where a handover is not possible for the base station 100B of which a handover is requested.

(2) Second Modification Example: Path Information Shared with Plurality of Base Stations 100B In the embodiments of the present disclosure described above, path information is provided to the base station 100 that is a handover target. However, a destination to which the path information is provided according to embodiments of the present disclosure is not limited to this example.

As the second modification example of embodiments of the present disclosure, a base station-to-base station message including the path information may be transmitted to the plurality of base stations 100.

Specifically, the base station-to-base station message including the path information may be transmitted to the plurality of base stations 100 derived from the moving path indicated by the path information. For example, the base station 100A (control unit 143) derives the base station 100B that is a handover target and a base station 100C estimated to be a future target based on the path information. The base station 100A (communication processing unit 145) transmits a Handover Request message including the path information to the base station 100B and the base station 100C.

In this way, according to the second modification example of embodiments of the present disclosure, a base station-to-base station message including the path information is transmitted to the plurality of base stations 100. The plurality of base stations 100 is derived based on the path information. This makes it possible to provide the path information to the base station 100 on the moving path of the UE 200 even in a case where no handover is performed because the UE 200 is, for example, powered off and causes communication interruption.

(3) Third Modification Example: N2 Based Handover

In the embodiments of the present disclosure described above, the handover processing is Xn based handover processing. However, the handover processing according to embodiments of the present disclosure is not limited to this example.

As the third modification example of embodiments of the present disclosure, the N2 based handover processing may be performed. Specifically, the handover processing is performed based signaling between the base station 100 and the core network via a next generation (NG) interface. The base station-to-base station message is indirectly transmitted via the NG interface.

An example of processing according to the third modification example of embodiments of the present disclosure will be described with reference to FIG. 9. FIG. 9 illustrates a case where the UE 200 has already reported path information to the base station 100A. Note that processing which is substantially the same as the processing of FIG. 8 will not be described.

The UE 200 transmits a Measurement Report to the base station 100A (S510).

The base station 100A transmits a Handover Required message including the path information to an access & mobility management function (AMF) (S520). For example, the base station 100A determines based on the Measurement Report received from the UE 200 whether or not to perform a handover for the UE 200. In a case where a handover is performed, the base station 100A transmits a Handover Required message including the path information to the AMF using an NGAP when the path information (for example, flightPathInfoReport) about the UE 200 has been already received.

The AMF transmits a Handover Request message including the path information to the base station 100B (S530). For example, the AMF obtains the path information included in the Handover Required message received from the base station 100A and transmits a Handover Request message including the path information to the base station 100B that is a handover target using an NGAP.

The base station 100B transmits a Handover Request Acknowledgement message to the AMF (S540). For example, when the base station 100B receives the Handover Request message from the AMF, the base station 100B stores the path information included in the Handover Request message as RRC context information about the UE 200. The base station 100B transmits a Handover Request Acknowledgement message including an RRCConnectionReconfiguration message to the AMF using an NGAP.

The AMF transmits a Handover Command message to the base station 100A (S550). For example, the AMF transmits a Handover Command message including the RRCConnectionReconfiguration message included in the Handover Request Acknowledgement message received from the base station 100B to the base station 100A using an NGAP.

The base station 100A transmits the RRCConnectionReconfiguration message to the UE 200 (S560). For example, the base station 100A transmits the RRCConnectionReconfiguration message to the UE 200 based on the received Handover Command message.

The UE 200 transmits an RRCConnectionReconfigurationComplete message to the base station 100B (S570). For example, the UE 200 has already reported the path information to the base station 100A and thus transmits, to the base station 100B, an RRCConnectionReconfigurationComplete message that does not include the information indicating the availability of the path information. Naturally, the RRCConnectionReconfigurationComplete message does not also include the path information.

In this way, according to the third modification example of embodiments of the present disclosure, a base station-to-base station message including the path information is transmitted via an NG interface. This makes it possible to transmit the path information to the base station 100B that is a handover target even in a case where no Xn interface is available between the base station 100A and the base station 100B.

(4) Fourth Modification Example: Explicit Indication of Transfer of Path Information In the embodiments of the present disclosure described above, the UE 200 is not notified of the transfer of path information between base stations. However, the transfer of the path information according to embodiments of the present disclosure is not limited to this example.

As the fourth modification example of embodiments of the present disclosure, a base station-to-base station message serving as a response to a base station-to-base station message for requesting a handover may include transfer information indicating that the path information has been already transferred.

Specifically, the Handover Request Acknowledgement message may include a Handover Command message including an RRCReconfiguration message that includes the transfer information.

For example, in a case where an RRCReconfiguration message received from the base station 100A that is a handover source includes the transfer information, the UE 200 transmits, to the base station 100B that is a handover target, an RRCReconfigurationComplete message including none of information indicating the availability of the path information and the path information.

In this way, according to the fourth modification example of embodiments of the present disclosure, a base station-to-base station message serving as a response to a base station-to-base station message for requesting a handover includes transfer information indicating that the path information has been already transferred. This makes it possible to indicate to the UE 200 that the path information is transferred to the base station 100B. It is thus possible to more reliably reduce signaling for reporting the path information without holding the report information in the UE 200.

(5) Fifth Modification Example: Compliance with Other TSs

In the example described in embodiments of the present disclosure, the system 1 is a system compliant with the TSs of 5G or NR. However, the system 1 according to embodiments of the present disclosure is not limited to this example.

In the fifth modification example of embodiments of the present disclosure, the system 1 may be a system compliant with other TSs in 3GPP. As an example, the system 1 may be a system compliant with the TSs of LTE, LTE-A, or 4G and the base station 100 may be an evolved node B (eNB). Alternatively, the base station 100 may be an ng-eNB. As another example, the system 1 may be a system compliant with the TSs of 3G and the base station 100 may be a Node B. As yet another example, the system 1 may be a system compliant with next generation (for example, 6G) TSs.

Alternatively, the system 1 may be a system compliant with TSs of another standards organization for mobile communications.

While embodiments of the present disclosure have been described above, the present disclosure is not limited to the embodiments. It will be understood by those skilled in the art that the embodiments are merely examples and various changes can be made without departing from the scope and the spirit of the present disclosure.

For example, steps in processing described in the present specification do not necessarily have to be executed chronologically in the order described in the flowchart or the sequence diagram. For example, steps in processing may be executed in an order different from the order described as the flowchart or the sequence diagram or may be executed in parallel. In addition, some of steps in processing may be removed or a further step may be added to the processing.

For example, there may be provided a method including the operations of one or more components of the apparatus described in the present specification or there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to by another name such as mobile station, mobile terminal, mobile apparatus, mobile unit, subscriber station, subscriber terminal, subscriber apparatus, subscriber unit, wireless station, wireless terminal, wireless apparatus, wireless unit, remote station, remote terminal, remote apparatus, or remote unit.

For example, in the present disclosure, "transmit" may mean performing processing of at least one layer in a protocol stack used for transmission or physically transmitting a signal wirelessly or by wire. Alternatively, "transmit" may mean a combination of performing the processing of the at least one layer and physically transmitting a signal wirelessly or by wire. Similarly, "receive" may mean performing processing of at least one layer in a protocol stack used for reception or physically receiving a signal wirelessly or by wire. Alternatively, "receive" may mean a combination of performing the processing of the at least one layer and physically receiving a signal wirelessly or by wire. The at least one layer may be replaced with at least one protocol.

For example, in the present disclosure, "obtain/acquire" may mean obtaining/acquiring information from stored information, obtaining/acquiring information from information received from another node, or obtaining/acquiring information by generating the information.

For example, in the present disclosure, "include" and "comprise" do not mean that listed items alone are included, but mean that listed items alone may be included or a further item may be included in addition to the listed items.

For example, in the present disclosure, "or" does not mean exclusive OR, but means inclusive OR.

Note that the technical features included in the embodiments may be represented as the following features. Naturally, the present disclosure is not limited to the following features.

(Feature 1)

A first base station (100A) comprising:

an information obtaining unit (141) configured to obtain path information indicating at least a moving path of a user equipment for which a handover is performed from the first base station to a second base station (100B); and a communication processing unit (145) configured to transmit a base station-to-base station message including the path information to the second base station, wherein the base station-to-base station message is a message associated with a handover.

(Feature 2)

The first base station according to Feature 1, wherein the base station-to-base station message is a message for requesting a handover to the second base station.

(Feature 3)

The first base station according to Feature 1, wherein the path information is included in the base station-to-base station message as radio resource control, RRC, related information.

(Feature 4)

The first base station according to any one of Features 1 to 3, wherein the base station-to-base station message is a Handover Request message.

(Feature 5)

The first base station according to Feature 4, wherein the path information is included in a HandoverPreparationInformation message of Handover Request.

(Feature 6)

The first base station according to Feature 5, wherein the path information is included in an RRCReconfiguration message of HandoverPreparationInformation.

(Feature 7)

The first base station according to any one of Features 1 to 6, wherein the base station-to-base station message is transmitted via an Xn interface.

(Feature 8)

A second base station (100B) comprising:

a communication processing unit (145) configured to receive, from a first base station (100A), a base station-to-base station message including path information that indicates at least a moving path of a user equipment for which a handover is performed from the first base station to the second base station; and an information obtaining unit (141) configured to obtain the path information included in the base station-to-base station message, wherein the base station-to-base station message is a message associated with a handover.

(Feature 9)

A method performed by a first base station (100A), comprising:

obtaining path information indicating at least a moving path of a user equipment for which a handover is performed from the first base station to a second base station (100B); and transmitting a base station-to-base station message including the path information to the second base station, wherein the base station-to-base station message is a message associated with a handover.

(Feature 10)

A method performed by a second base station (100B), comprising:

receiving, from a first base station (100A), a base station-to-base station message including path information that indicates at least a moving path of a user equipment for which a handover is performed from the first base station to the second base station; and obtaining the path information included in the base station-to-base station message, wherein the base station-to-base station message is a message associated with a handover.

(Feature 11)

A program for causing a computer to execute operations of:

obtaining path information indicating at least a moving path of a user equipment for which a handover is performed from a first base station (100A) to a second base station (100B); and transmitting a base station-to-base station message including the path information to the second base station, wherein the base station-to-base station message is a message associated with a handover.

(Feature 12)

A program for causing a computer to execute operations of:

receiving, from a first base station (100A), a base station-to-base station message including path information that indicates at least a moving path of a user equipment for which a handover is performed from the first base station to a second base station (100B); and obtaining the path information included in the base station-to-base station message, wherein the base station-to-base station message is a message associated with a handover.

(Feature 13)

A non-transitory tangible computer-readable storage medium having stored therein a program for causing a computer to execute operations of:

obtaining path information indicating at least a moving path of a user equipment for which a handover is performed from a first base station (100A) to a second base station (100B); and transmitting a base station-to-base station message including the path information to the second base station, wherein the base station-to-base station message is a message associated with a handover.

(Feature 14)

A non-transitory tangible computer-readable storage medium having stored therein a program for causing a computer to execute operations of:

receiving, from a first base station (100A), a base station-to-base station message including path information that indicates at least a moving path of a user equipment for which a handover is performed from the first base station to a second base station (100B); and obtaining the path information included in the base station-to-base station message, wherein the base station-to-base station message is a message associated with a handover.

What is claimed is:

1. A first base station comprising:

a memory storing a program; and one or more processors configured to execute the program to:

receive, from a communication apparatus, a first radio resource control, RRC, message including information indicating that the communication apparatus has path information available;

transmit, to the communication apparatus, a second RRC message including information for requesting transmission of the path information;

determine whether to perform a handover from the first base station to a second base station for the communication apparatus;

receive in response to the transmission of the second RRC message including the information for requesting transmission of the path information, from the communication apparatus, a third RRC message including the path information in a case where the communication apparatus has the path information available;

include the path information in a HandoverPreparationInformation message in a case where the handover is determined to be performed; and transmit the HandoverPreparationInformation message including the path information to the second base station.

2. The first base station according to claim 1, wherein the one or more processors are configured to execute the program to transmit the HandoverPreparationInformation message including the path information to the second base station using an XnAP (Xn application protocol) via a control plane signaling of Xn interface.

3. The first base station according to claim 1, wherein the first RRC message includes a message of the completion of an RRC connection establishment, a message of the completion of an RRC connection re-establishment, and a message of the completion of an RRC connection resumption, and, the third RRC message includes a UEInformationResponse message.

4. The first base station according to claim 1, wherein the path information includes information of a flight path or a moving path.

5. A communication apparatus comprising:

a memory storing a program; and one or more processors configured to execute the program to:

transmit, to a first base station, a first radio resource control, RRC, message including information indicating that the communication apparatus has path information available;

receive, from the first base station, a second RRC message including information for requesting transmission of the path information;

perform a handover from the first base station to a second base station; and transmit in response to the reception of the second RRC message including the information for requesting transmission of the path information, to the first base station, a third RRC message including the path information in a case where the communication apparatus has the path information available, wherein the path information is included in a HandoverPreparationInformation message for the handover from the first base station to the second base station, and the HandoverPreparationInformation message including the path information is transmitted from the first base station to the second base station.

6. The communication apparatus according to claim 5, wherein the HandoverPreparationInformation message including the path information is transmitted from the first base station to the second base station using an XnAP (Xn application protocol) via a control plane signaling of Xn interface.

7. The communication apparatus according to claim 5, wherein the first RRC message includes a message of the completion of an RRC connection establishment, a message of the completion of an RRC connection re-establishment, and a message of the completion of an RRC connection resumption, and, the third RRC message includes a UEInformationResponse message.

8. The communication apparatus according to claim 5, wherein the path information includes information of a flight path or a moving path.

9. A method performed by a first base station, comprising:

receiving, from a communication apparatus, a first radio resource control, RRC, message including information indicating that the communication apparatus has path information available;

transmitting, to the communication apparatus, a second RRC message including information for requesting transmission of the path information;

determining whether to perform a handover from the first base station to a second base station for the communication apparatus;

receiving in response to the transmission of the second RRC message including the information for requesting transmission of the path information, from the communication apparatus, a third RRC message including the path information in a case where the communication apparatus has the path information available;

including the path information in a HandoverPreparationInformation message in a case where the handover is determined to be performed; and transmitting the HandoverPreparationInformation message including the path information to the second base station.

10. The method according to claim 9, comprising transmitting the HandoverPreparationInformation message including the path information to the second base station using an XnAP (Xn application protocol) via a control plane signaling of Xn interface.

11. The method according to claim 9, wherein the first RRC message includes a message of the completion of an RRC connection establishment, a message of the completion of an RRC connection re-establishment, and a message of the completion of an RRC connection resumption, and, the third RRC message includes a UEInformationResponse message.

12. The method according to claim 9, wherein the path information includes information of a flight path or a moving path.

* * * * *